United States Patent

[11] 3,622,763

[72] Inventor Joseph J. Barber
 Williamsville, N.Y.
[21] Appl. No. 839,971
[22] Filed July 8, 1969
[45] Patented Nov. 23, 1971
[73] Assignee Houdaille Industries, Inc.
 Buffalo, N.Y.

[54] INCREMENTAL NUMERICAL CONTROL
 9 Claims, 6 Drawing Figs.
[52] U.S. Cl. ................................................. 235/151.11,
  307/203, 307/273, 340/347 AD
[51] Int. Cl. ........................................................ G05b 19/42
[50] Field of Search ........................................... 235/92,
  151.11

[56] References Cited
 UNITED STATES PATENTS
 3,274,583 9/1966 Boyd .......................... 235/92 X

*Primary Examiner*—Malcolm A. Morrison
*Assistant Examiner*—R. Stephen Dildine, Jr.
*Attorney*—Hill, Sherman, Meroni, Gross & Simpson

ABSTRACT: A numerical control system having a main counter for registering successive displacement commands and for counting down to zero as the load reaches the commanded end position wherein an auxiliary counter maintains the load at such end position during reading of a new command into the main counter. A zero crossing network for controlling the drive circuits and the main counter can accommodate unlimited overshoot and oscillation of the load relative to the end point. Position decoding logic directly energizes the summing input of an operational amplifier with the analog signals controlling slowdown and positioning.

Fig. 6

INCREMENTAL NUMERICAL CONTROL

SUMMARY OF THE INVENTION

This invention relates to a numerical control system and method and particularly to an incremental numerical control system wherein successive displacement commands are registered in up-down counters which then control positioning.

It is an object of the present invention to provide a novel incremental numerical control system capable of rapid positioning operations.

It is another object of the invention to provide a numerical control system allowing overshoot of a commanded end position to any desired degree for efficient positioning.

Another object is to provide a numerical control system having unlimited overshoot and accommodating serial loading of new commands without loss of positioning accuracy.

Still another object is to provide a counter-controlled positioning system which allows loading of new commands without loss of closed loop positioning control.

Features of the invention reside in a novel zero crossing network accommodating unlimited overshoot or oscillation relative to a commanded end point, a novel monostable circuit for eliminating noise problems, a so called notch or auxiliary counter circuit for maintaining closed loop control during loading of new commands, and direct energization of analog error circuits from the digital positioning logic.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DETAILED DESCRIPTION OF A PREFERRED EMBODIMENT

Figure 1:
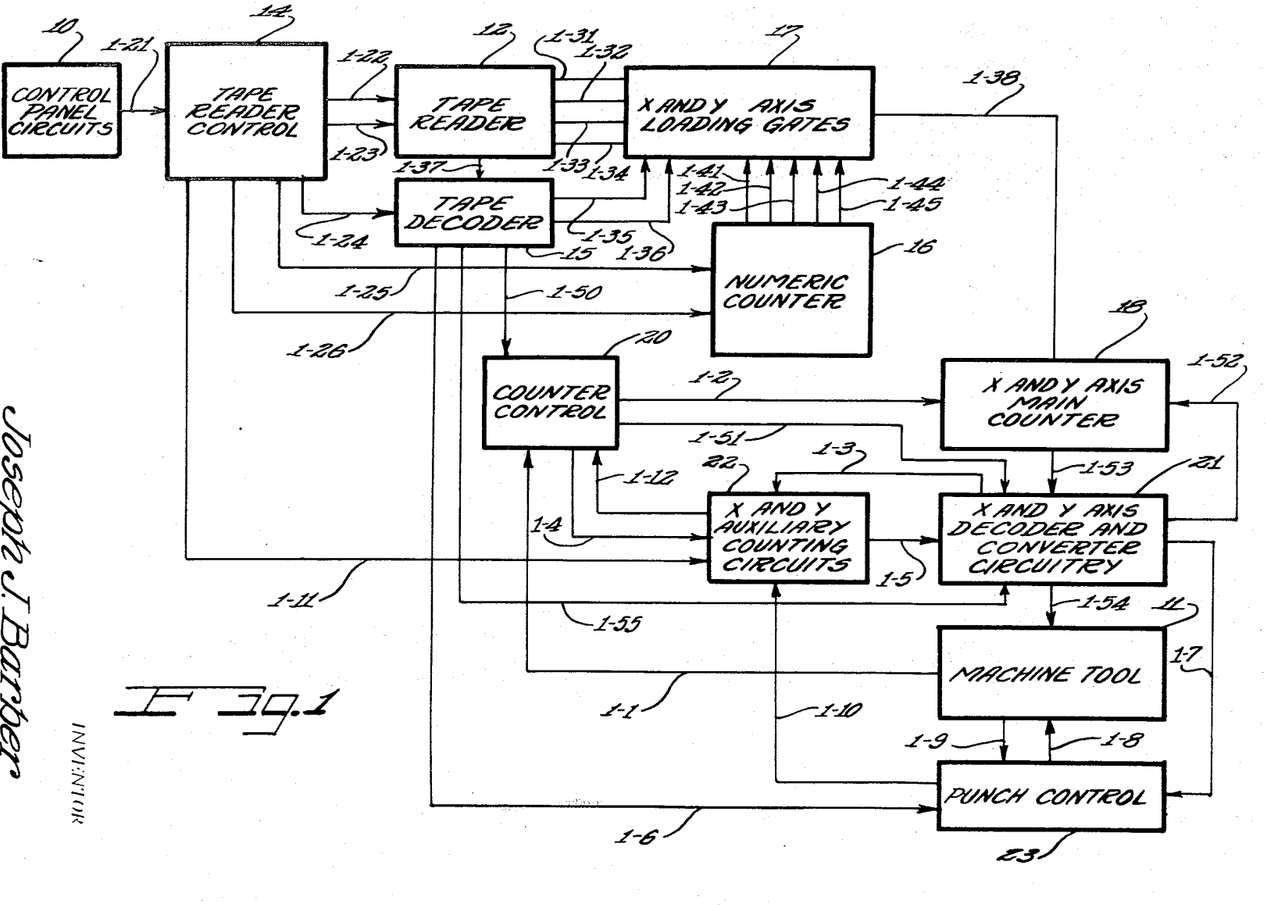
FIG. 1 is a block diagram illustrating a system and method in accordance with the present invention.

FIG. 1 illustrates a numerical control system for controlling positioning along two axes of freedom, for example of the work positioning table of a punch press. In the system of FIG. 1 a control panel 10 at the site of a machine tool 11 provides for control of the system by an operator. The control panel has suitable push buttons and selector switches for manual control of positioning or for operation in an automatic mode wherein positioning information is received from perforated paper tape by means of a tape reader 12 under the control of a tape reader control 14. Associated with the tape reader 12 is a tape decoder component 15 and a numeric counter 16 for controlling the loading of the numerical command data from the tape via loading gates component 17 into the X- and Y-axis main counters 18. The tape decoder component 15 also determines the direction of the desired move and supplies this information to a counter control component 20.

When the commanded displacements with respect to the X- and Y-axes have been entered into the counters of component 18, positioning is initiated and the digital counts in the counters 18 serve as digital error signals which are supplied to decoder and converter circuitry represented by component 21. The circuitry 21 generates an analog error signal which is supplied to the servo drive components of the machine tool 11. The respective axes of the machine tool are provided with incremental transducers which respond to motion of the respective axes to supply feedback signals via a line 1-1 to the counter control circuit 20. The counter control circuit includes suitable motion pulse generating circuits responsive to the transducer feedback signals to supply motion pulses of proper polarity via line 1-2 to the counter input of the counters 18. Thus, during a positioning operation, the machine axes are driven in accordance with the displacement commands loaded into the counters 18 under closed loop control with the feedback circuit extending via line 1-1, counter control 20 and line 1-2. The decoder circuitry 21 includes means for detecting certain selected slow down points so that the servo drives of component 11 are progressively decelerated as the commanded end position is approached.

For rapid positioning, the load may approach the commanded end point with sufficient speed so that a certain amount of overshoot will result. The circuitry 21 will detect the instant of time when the load moves through the commanded end position, that is when the associated main counter of component 18 has counted down to a zero count. At this instant, driving signals to the machine tool axis will be zero. In the event of an overshoot, the polarity of the analog error to the axis drive circuits is reversed so that the axis is returned toward the commanded end position. The circuitry is such as to accommodate oscillation about the commanded end position as the axis settles at the position corresponding to a zero count in the main counter of component 18. When both axes are at the commanded end positions, an in position signal is transmitted via line 1-3 from circuitry 21 to auxiliary counter circuitry 22. As will be described hereinafter, the auxiliary counter circuit 22 maintains closed loop servocontrol of the machine axes during the time interval when new displacement commands are being loaded into the main counter components 18. In this mode, the transducer feedback information supplied via line 1-1 to the counter control 20 is converted into motion pulse information which is transmitted by the counter control via line 1-4 to the auxiliary counter circuits 22. The auxiliary counter circuits then supply analog control signals via line 1-5 in the event of any slight shifting of the load. In the illustrated embodiment, the auxiliary control loop is activated during operation of the tape reader 12 and during any punch cycle which is effected under the control of component 23. Tape decoder component 15 may signal via line 1-6 to the punch control 23 when a punch operation is desired, and the decoder and converter circuitry 21 may signal the punch control via line 1-7 when the axes are in position ready for a punch operation. Punch control 23 may transmit a punch command via line 1-8 to initiate a punch cycle, and completion of the punch cycle may be signaled via line 1-9. The auxiliary counter circuits 22 are signaled that a punch cycle is in operation via line 1-10 from punch control 23. Similarly tape reader control 14 advises the auxiliary counter circuits 22 of a tape reading cycle via line 1-11.

When the punch cycle is completed as signaled by line 1-10 and when the tape reader cycle is completed as signaled by line 1-11, the auxiliary counter circuits component 22 signals counter control component 20 via line 1-12 to reenable the amino counters 18 and to begin a new positioning cycle. Preferably, however, the auxiliary counter circuits 22 include means for insuring that the auxiliary counters register zero error before control is returned to the main servo loop including the main counters 18. In this way, the possibility of errors accumulating during the tape reading and punch cycles is avoided.

Figures 2, 2A:
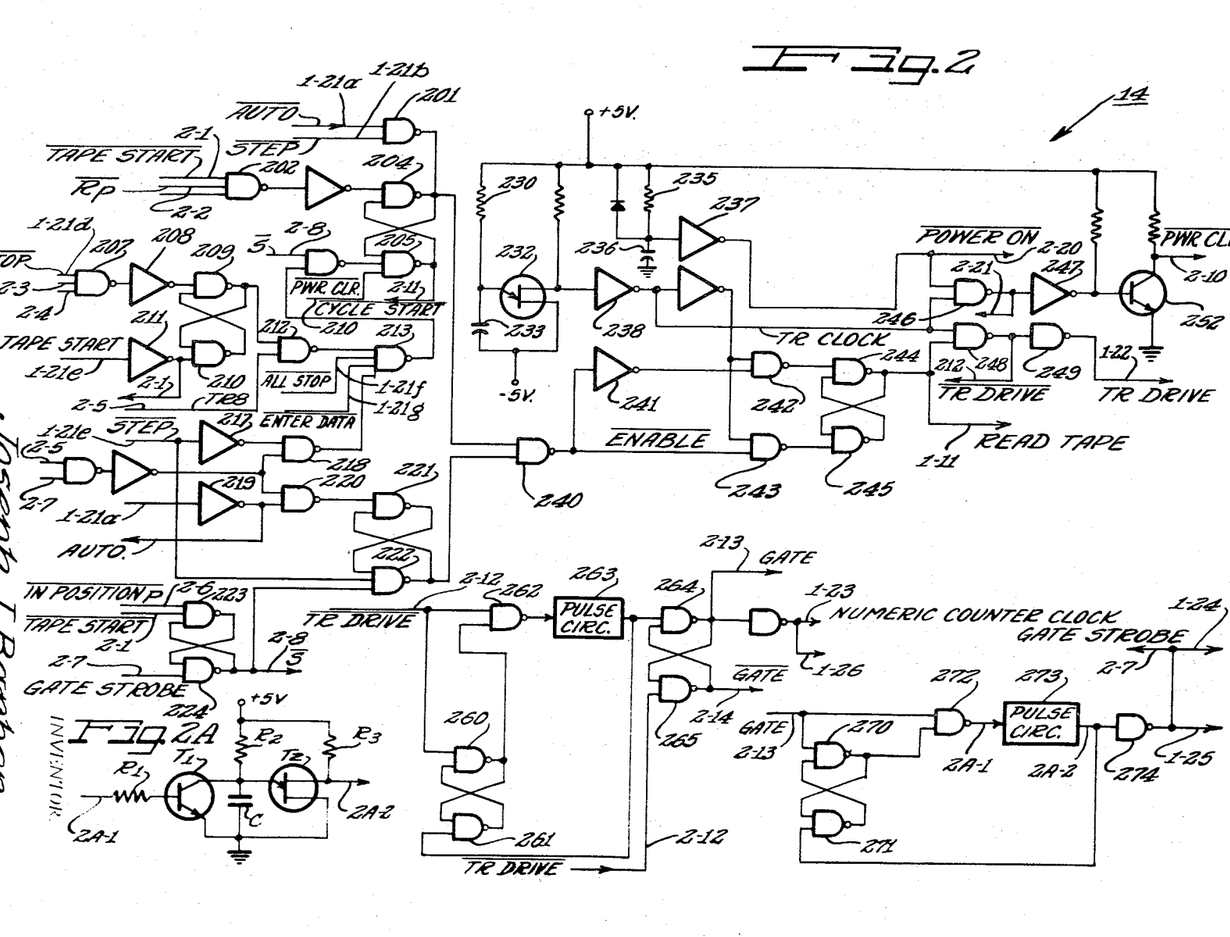
FIG. 2 is a logical diagram illustrating a preferred tape reader control circuit for the system of FIG. 1.
FIG. 2A shows a pulse circuit.

The detailed significance of the connections between components 10, 12, 15, 16 and 17 as indicated by lines 1-21 through 1-26, 1-31 through 1-36 and 1-41 through 1-45 can best be described in relation to the reader control circuit of FIG. 2.

In the several views in order to facilitate location of referenced parts, the parts of the respective figures will be designated by three digit reference numerals with the first digit corresponding to the figure number. Further, in general, reference numerals will be applied beginning at the upper left of a figure and moving downwardly and then in successive sections from left to right. In designating connecting lines represented in FIG. 1, successive individual conductors of a line are designated by the line reference character followed by a small letter where the lines consist of more than one conductor. In other cases conductors are designated by hyphenated reference numerals with the first number corresponding to the figure-number where the conductor first appears.

In the following description, a logical one is defined as being 5 volts and is called "high," while logical zero is defined as being 0 volts and is called "low," By way of example, the logic elements shown in the following figures of drawing may be from the Motorola MC830P series. In general, for the sake of brevity, the logic elements will be referred to directly by their reference numerals in the following description.

TAPE READER CONTROL OF FIGS. 2 AND 2A

In describing the tape reader control, reference will first be made to the upper left hand corner of FIG. 2. Logic element 201 has two inputs 1–21a, 1–21b termed $\overline{\text{Auto}}$ and $\overline{\text{Step}}$. This element 201 prevents the tape reader 12, FIG. 1, from being run in anything but the Auto or Step modes; that is if the system is not in either mode, the tape reader cannot be run. Element 202 accepts negative going pulses which can cause the cycle start flip-flop composed of 204 and 205 to be set. Negative going impulses at the input of 202 will cause the output of 204 to go high thus giving a cycle start signal at the tape reader. The $\overline{\text{Tape Start}}$ signal at 2–1 comes from inverter 211, FIG. 2. The tape start signal at 1–21e, which is the input to this inverter 211, originates at control panel 10, FIG. 1, and is generated by depressing the Cycle Start pushbutton (not shown) on the control panel. Input $\overline{R}_p$ at 2–2 is generated at the lower part of FIG. 6. This is a pulse generated when both the X- and Y-axes come into the retract position. The cycle start flip-flop 204–205 can be turned off by depressing the cycle stop pushbutton (not shown) on the control panel 10 (input 1–21d); or reading an M12 (input 2–3) or an M75 (input 2–4) in a block of tape will turn the cycle start flip-flop, 204–205 off when the end of block is reached. This is performed by logic elements 207–212. The flip-flop, composed of 209 and 210 is reset when the cycle start pushbutton is once again depressed. An All Stop signal at 1–21f can cause a cycle stop also. This will be found as an input to logic element 213.

When in the Step mode of operation and an end of block (a tape reader 8 channel) is read, a cycle stop will be given also. This function is performed by elements 217 and 218. The tape start signal at 1–21e can be generated only when both axes are in position (X=Y=0). When in the automatic mode of operation, elements 219 and 220, and the flip-flop composed of 221 and 222 perform the following function: when a tape start condition is initiated, the output of 222 goes high allowing tape to be read. When the end of block is reached, the upper input to 221 will go low causing the output of 221 to go high forcing the output of 222 to go low and turning off the tape reader 12. The flip-flop composed of 223 and 224 is needed to allow the tape to be started once again. This flip-flop holds the output of 222 high until the tape has moved off of the tape reader 8 channel.

The tape reader can be started either by generating a tape start signal at 1–21e or an in-position signal at 2–6, leading to the input of 223. The 2N4871 unijunction transistor 232, the 6,800 ohm resistor 230 and 1 microfarad capacitor 233 form an astable multivibrator which oscillates at a frequency of approximately 125 cycles per second. This signal is inverted by element 238 and is called the tape reader clock signal (TR clock). The elements of 240–245 comprise a circuit which allows the tape reader clock to be gated via 248 and 249 into the tape reader 12 only after it has gone low once and then gone high. This prevents reading partial pulses into the tape reader and causing it to misstep. The circuit composed of a 4,700 ohm resistor 235, 200 microfarad capacitor 236, and element 237 does the following: the output 237 will stay high for approximately 100 milliseconds after power is turned on at which point it will go low. This is called the $\overline{\text{Power On}}$ signal (at 2–20).

In the circuit at the upper right in FIG. 2, the $\overline{\text{Power On}}$ signal is gated with the tape reader clock to generate a power clear train of pulses at 2–10 which last approximately 100 milliseconds. This signal is used to bring all flip-flops in the control into a known initial state. This circuit is composed of elements 246, 247 and the 2N3569 transistor 252. The tape reader clock is gated with a signal called Read Tape (which appears at 1–11) and supplies TR Drive pulses via 1–22 to the tape reader circuit. The tape reader is such that it will step one character for each pulse input it receives. Each time the tape reader is advanced one character, the one-shot 260–265 at the bottom center of FIG. 2 generates a Gate pulse output at 2–13. This pulse is delayed relative to the tape reader drive signal at 1–22 enough to insure that the tape reader is on character by the time this pulse appears. Thus, the flip-flop formed by 264 and 265 will drive 2–13 high after the tape reader is on character. The Gate signal at 2–13 is turned off when the next tape reader drive pulse is generated at 2–12. The gate caused the one-shot 270–274 at the lower right in FIG. 2 to generate a strobe signal at 1–24 and 1–25. This signal is a pulse occurring in the middle of the gate signal. This signal is used to strobe data into the control. The tape reader channel coming out of the tape reader are gated with the gate signal and distributed throughout the control for example as indicated at 1–31 to 1–34 and at 1–37.

FIG. 2A shows the details of the pulse circuits 263 and 273 forming part of the one-shot multivibrators 260–265 and 270–274 in FIG. 2. Its input is labeled 2A-1, its output is labeled 2A-2. Referring to the monostable 270–274, for example, and applying the reference numerals 2A-1 and 2A-2 to pulse circuit 273, with the input signal low (at 2–13) the output of 270 will be held high and the input 2A-1 of circuit 273 will be held high, and the output 2A-2 of circuit 273 will normally be high; thus the output of 271 will be low. The input 2A-1 being high in FIG. 2A will cause the 2N5134 transistor T1 to be saturated. This prevents the capacitor C from charging up; the output of 274 will be held low. When the gate signal goes high at 2–13, input 2A-1 will go low. The 2N5134 transistor T1 will cut off and allow the capacitor C to charge through the resistor R2 from the plus 5 volt supply. When the voltage across the capacitor reaches approximately 3.5 volts, the 2N4871 unijunction transistor T2 will conduct and discharge the capacitor C. At this time, a negative going pulse will appear at 2A-2. This pulse will force the output of 271 to go high and in turn the output of 270 will go low. When this happens, 2A-1 will go high and saturate the 2N5134 transistor T1 once again. As soon as the gate signal at 2–13 goes low once more, the circuit will be in its original state. Thus, when the input goes high, the output at 1–24, and 1–25 and 2–7 will deliver a pulse whose delay will be determined by the RC time constant of the resistor R2 and the capacitor C. (For circuit 273, R2=3,300 ohms and C=0.1 microfarad.) The only restriction on this is that the input must stay high long enough for the circuitry to time out. Hereafter in this description, this circuit will be described merely as a one-shot. This circuit has certain advantages, one of them being that it is extremely noise-immune. This circuit has been tested with noise spikes of over 7 volts appearing on the ground line and it has not misfired. It also has the advantage in that it can deliver a delayed pulse which would require two normal one-shots to do this. In this way, it provides a cost savings of about 50 percent.

Numeric Counter 16

The numeric counter 16, FIG. 1, is used to control the strobing of numerical information off of tape into the main up-down counters 18. The numeric counter is reset every time it sees an alphabetical character or an end of block. Once being reset, it will be advanced every time a tape reader pulse (TR Drive) signal at 1–22 is generated. The numeric counter consists of simply a ring counter (not shown) with one bit coming up each time it is stepped. The outputs of the counter at 1–41 to 1–45 are gated with the gate strobe signal from line 1–25 and are used to generate the first, second, third, fourth, and fifth digit signals.

Tape Decoder 15

The tape decoder circuitry 15 is the circuitry used to decode alphabetical characters from tape. These characters, once decoded, are used to set flip-flops such as an X flip-flop whose output is indicated at 1–35. (The corresponding Y output is applied to line 1–36.) When an X character is detected, and the gate strobe signal is generated (at 1–24), a negative going pulse will be produced which will set the X flip-flop. The output of the X flip-flop will stay high until the next time an alphabetical character which is not a plus or a minus is seen, or whenever a clear signal is generated. (This $\overline{Clear}$ signal is generated whenever an end of block is read or whenever power clear is generated.)

Figure 3:
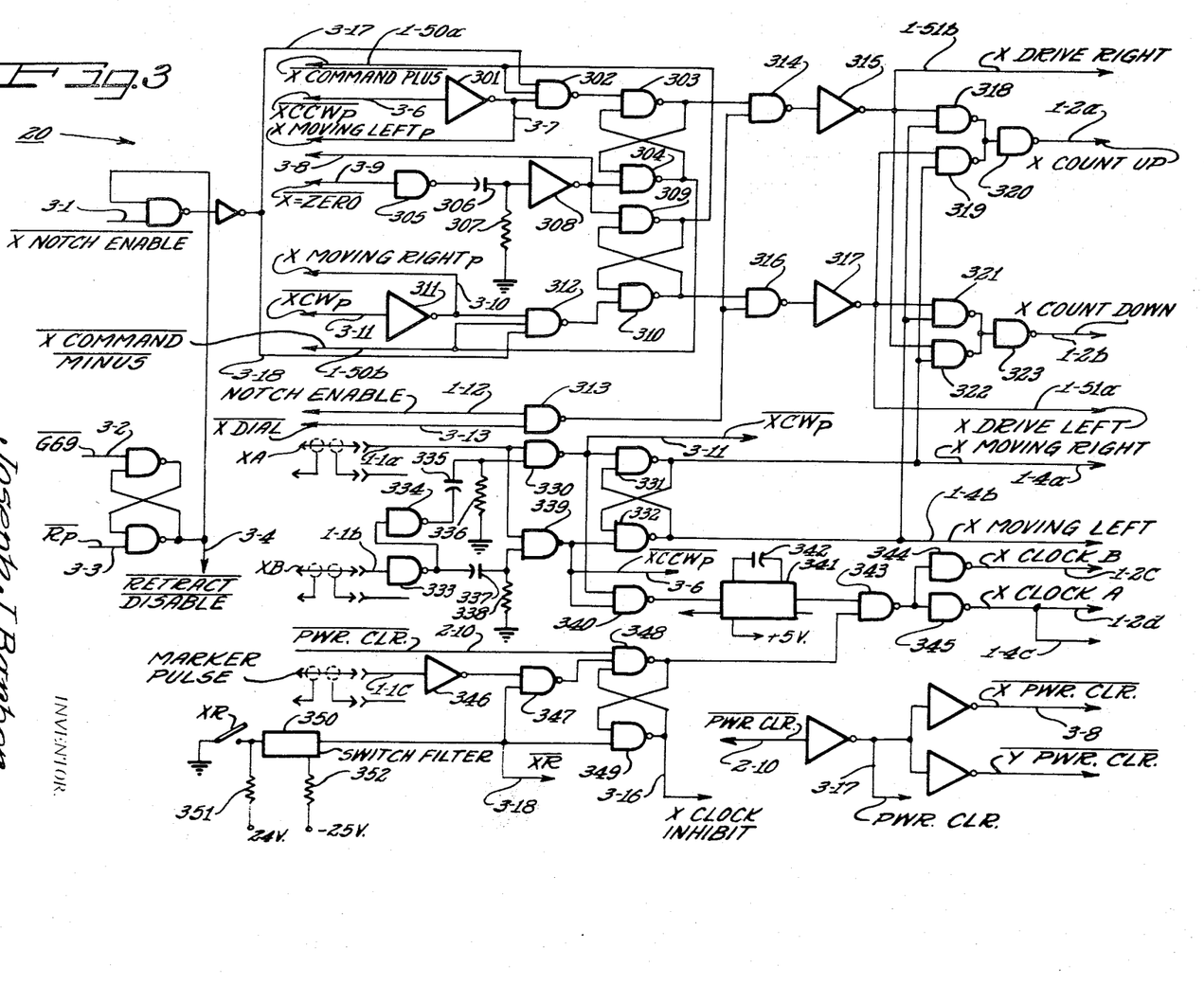
FIG. 3 is a logical circuit diagram illustrating a preferred counter control circuit for the system of FIG. 1.

The X and Y command plus and minus flip-flops supply signals such as the X command plus signal controlling conductor 1–50a, FIG. 3, of line 1–50, FIG. 1. Whenever the X flip-flop is in the high state and a plus signal is detected from tape, the X command plus flip-flop of component 15 is set. This indicates that an X command plus instruction has been received off of tape.

X- and -Axis Loading Gates 17

The X and Y loading gates 17 of FIG. 1 are used to strobe data into the main up-down counters 18 when numerical data is received off tape. The first through fifth digit signals coming in via lines 1–41 to 1–45 are generated by the numeric counter 16 and the gate strobe signal at 1–25. The X signal at 1–35 comes from the X flip-flop of tape decoder 15. This data enables the first four channels of tape which describe numerical characters (having weights in the ratio of 1:2:4:8) to be strobed in via lines 1–31 to 1–34.

The conductors of line 1–38, FIG. 1, lead to respective counter stages of binary coded decimal counters 18 and control the state (logical one or logical zero) to be set therein. As an example, one conductor of line 1–38 may be designated $\overline{Set}$ $X_{58}$. (The bar over the signal, of course, indicates that when the set $X_{58}$ condition arises, this goes to zero.) The $X_{58}$ implies that it refers to the X-axis it's the fifth digit and it's the bit with a weighting of eight of the fifth digit; (thus, as further examples $X_{51}$ would refer to the one bit of the fifth digit; $x_{32}$ would refer to the two bit of the third digit; and $X_{14}$ would refer to the four bit of the first digit). The output conductors of line 1–38 simply go low whenever that particular bit is read off of tape and such bit is then stored in the up-down counters 18.

Counter Control of FIG. 3

The description may be restricted to the operation of the X-section of counter control 20, since the Y-section may be essentially identical. The circuits made up of the logic elements 301–312 comprise what is known as the zero crossing circuitry. Whenever the main counters 18 indicate that the axis is at a zero position, or in other words in position, a pulse is generated at the output of 308. This is a negative going pulse and will set the two flip-flops 303, 304 and 309, 310 such that the outputs of 304 and 309 are both high. When this occurs, the control circuitry knows that the axis is at zero. Every time the axis moves off zero and moves back in, this condition will reoccur; that is, the outputs of 304 and 309 will both be set high.

When data is being read in off of tape, inputs to these circuits are disabled through the X disable lines 3–17 and 3–18 going into 302 and 312. Whenever a plus or a minus is read off of tape, the flip-flops are preset accordingly. The $\overline{X\ command}$ plus and $\overline{X\ command\ minus}$ conductors 1–50a and 1–50b are part of line 1–50 from tape decoder 15, FIG. 1. Suppose a plus signal was seen off of tape that would preset the flip-flop composed of 309 and 310 such that the output of 309 would be low and the output of 310 would be high. This would then go to the decoding and converter circuitry 21 via line 1–51 and tell the machine axis which way to move; also the signals at 1–2a and 1–2b go to the main counters 18 (via line 1–2) to tell the counter which way to count. For example, if an X command plus has been seen at 1–50a, the output of 303 will be low, the output of 304 will be high, the output of 309 will be low, and the output of 310 will be high. As soon as the drive is enabled through 313 the output of 313 goes high, and there are two highs at the input of 316 which will cause a high to appear at the output of 317. In like manner, the output of 315 will be low. These two signals will tell the axis which way to drive. In this case, the output of 317 being high will tell the axis to drive left and the output of 315 being low will tell it that it should not drive right. This is correct since plus moves are supposed to make the X-axis go left. The fact that we want to go left will cause the up and down lines to be switched the following way.

The transducer decoding circuitry at the lower part of FIG. 3 is energized via line 1–1 (conductors 1–1a, 1–1b and 1–1c in FIG. 3) from the incremental transducer of component 11, FIG. 1. The transducer pulses are decoded such that the output of 330 will have negative going pulses on it when the axis leadscrew is rotating clockwise and the output of 339 will have negative going pulses on it when rotation is counterclockwise. The fact that these pulses occur at these points will cause the flip-flop comprised of 331 and 332 to be set in the appropriate state; thus when X clockwise pulses are produced (at 3–11), the output of 331 will go high (this will say via conductor 1–4a that X is moving right); conversely, when counterclockwise pulses are produced (at 3–6), X moving left conductor 1–4b will go high. Thus if the drive motors of component 11 are hooked up properly, counterclockwise pulses at 3–6 will be produced when we tell the machine table to drive left (along the axis) and it will be moving left. The decoding circuitry at the upper right hand part of FIG. 3 thus states that X is supposed to drive left (at 1–51a), it is moving left (at 1–4b); therefore, the X counter should countdown (at 1–2b). The actual clock pulses are generated from the output of 340; they go through the conventional monostable circuit 341. Circuit 341 provides a six microsecond delay and is used to give sufficient delay so that the count line 1–2a or 1–2b will have to come up before the clock conductors such as 1–2c and 1–2d start clocking. This is a requirement of the main up-down counters 18. The clock line is split in half into conductors 1–2c and 1–2d called clock A and B simply for drive purposes. One logic element cannot drive all the counter stages by itself. The output of monostable 341 is gated when the marker pulse (via conductor 1–1c) arrives from the X transducer. Thus when the axis goes into retract, the X right limit switch XR will be actuated and $\overline{XR}$ will be low (conductor 3–15). This sets the output of 349 high and the output of 348 low. As soon as the axis comes off of the limit, switch XR opens and the first marker pulse will cause the output of 348 to go high and allow clock pulses to be gated into the main up-down counter 18. Now with the drive moving left and the counter 18 counting down, operation will continue until the counter reaches zero count at which point movement along the X-axis should stop. Of course, due to machine dynamics an overshoot may occur.

When the main X counter of component 18 gets to zero, the X = Zero signal at line 3–9 will cause the outputs of 304 and 309 to be set high. If you follow this through a decoding, you will see that it tells the main X-axis counter to neither count up nor countdown and to drive in neither direction. Due to machine dynamics, the axis will overshoot. Since rotation was counterclockwise to begin with, it would continue to rotate in the same direction and counterclockwise pulses would appear at the output of 301 at the top left of FIG. 3. This will cause the output of 303 to go high and the output of 315 likewise to go high. This tells the X-axis to drive right (via conductor 1-51b). At the same time, it will also tell the counters to count up (via conductor 1-2a). Since we have reversed the drive, the axis will at some time after it crosses zero reverse itself and start turning clockwise. Once it starts turning clockwise, the decoding circuitry will tell the counters to countdown. As soon as the axis reaches zero, the outputs of 304 and 309 will both be set high once more telling the system to drive in neither direction and to count in neither direction. This time if the axis (or more precisely the movement of the machine table along the X-axis) overshoots going in the opposite direction, clockwise pulses will be seen and the output of 310 will go high. This sets the output of 315 high and will tell the main X-axis counter to count up. The axis will soon reverse its direction and go counterclockwise at which time the X-axis counter will be instructed to countdown. As soon as it reaches zero again, the output of 304 and 309 will both be set high. This circuit operation continues until the axis settles out at a position corresponding to a zero count in the main X-axis counter. The Y-axis counter control circuitry works in the same manner.

Main Counters 18

The main counters 18 need not be illustrated in detail since these may be conventional binary coded decimal up/down counters having five decimal stages. The input to the fifth digit (least significant) stage of the X and Y main counters may be controlled from the decoder and converter circuitry 21 as indicated by the line 1-52 in FIG. 1. The X-axis conductor 1-52a of this line termed "X Retract Gated" is indicated at the center left of FIG. 6. The counter input is controlled such that the counter can only count when the axis is not retracting and when it sees an up or down signal on the conductors such as 1-2a and 1-2b, FIG. 3, which are part of line 1-2 from the counter control 20. To illustrate a typical control connection, reference may be had to the lower left hand part of FIG. 6 wherein the control input $C_{in}$ to the first stage of the main X-axis counter, which input corresponds to the similarly designated input of the Cambion integrated circuit up/down BCD counter, Cambion part No. 780-2704. It will be observed that if the X count up and X countdown conductors 1-2a and 1-2b are both in low condition, the output of element 623 will be a low or ground condition (0 volts) which will disable the counter. Similarly, if the "X Retract Gated" signal is "true", the high signal at conductor 1-52a at the bottom left of FIG. 6 will result in a ground potential at the output of element 624 disabling the main X-axis counter.

Since conductor 1-52a will be high when the axis is retracting, the counter is disabled at this time.

Figure 4:
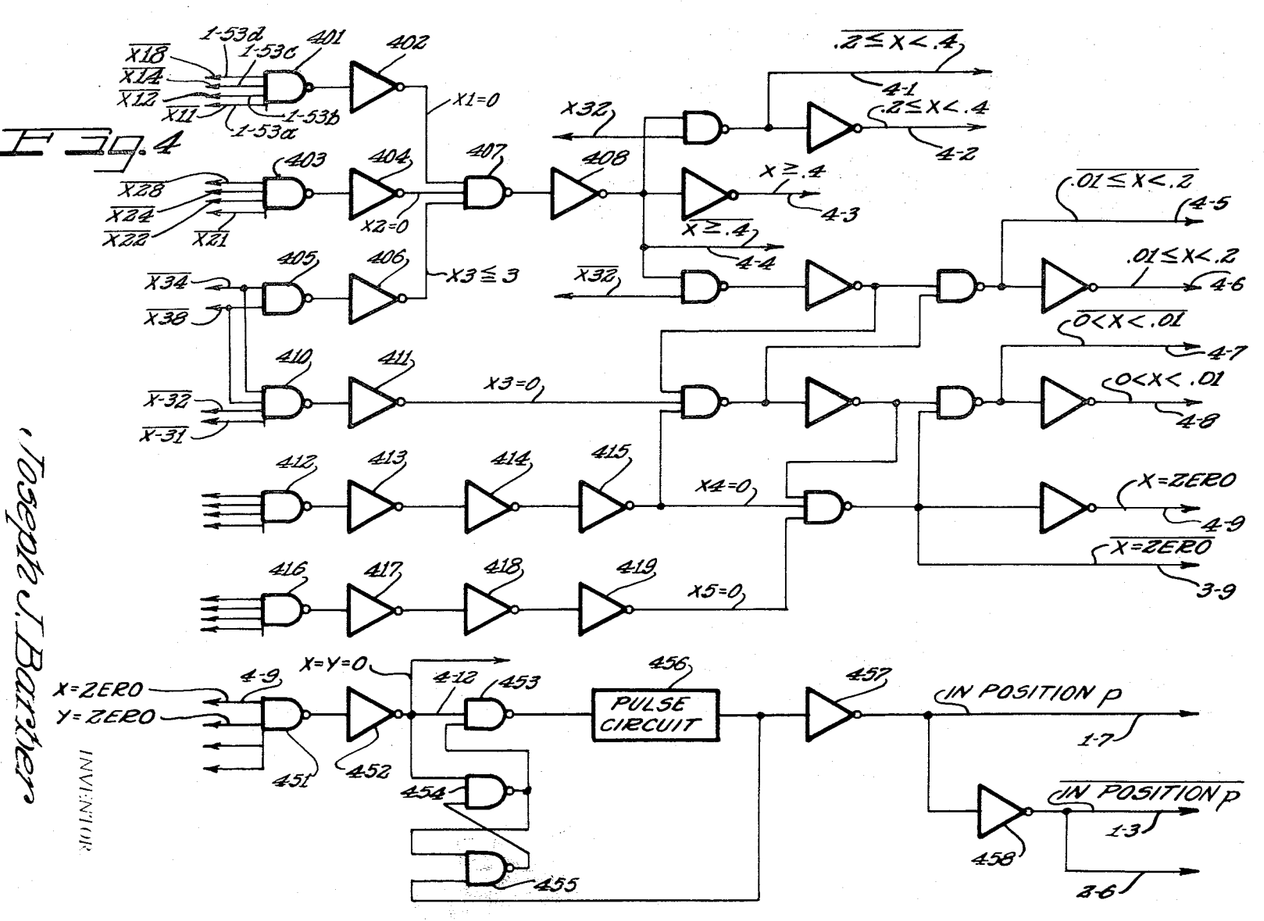
FIG. 4 is a logical diagram illustrating preferred position decoder circuitry for the system of FIG. 1.

The outputs of the counters are connected to the decoder and converter circuitry 21 by means of line 1-53. The notation conforms with that previously discussed in connection with the loading gates component 17, and the individual conductors are illustrated in FIG. 4. The X and Y main counters may be essentially identical, so that detailed reference to the Y main counter is unnecessary.

Position Decoder Circuit Of FIG. 4

Component 21 in FIG. 1 includes X- and Y-axis position decoders. The purpose of these decoders is to give output signals that tell the digital to analog converter of FIG. 6 where the axis is in relation to its final position. For instance the output 4-4 labeled X 0.4 means that the X axis position is more than four-tenths of an inch away from its final position. Likewise, $0.2 \leq X < 0.4$ (output 4-2) means that the axis is between two-tenths and four-tenths of an inch from its final position. The generation of these signals is pretty straight forward. The output of 402 tells us when the first digit of X (X1) is equal to zero, the output of 404 tells us when the second digit (X2) is equal to zero, the output of 406 tells us that X3 is less than or equal to three which means in this case three-tenths of an inch since the third digit represents tenths of an inch. (The input conductors such as 1-53a to 1-53d are part of line 1-53, FIG. 1, and the designations such as $\overline{X11}$ indicate the stage of counters of component 18 with which each conductor such as 1-53a is associated.) Gating these three signals together and inverting twice gives us the signal (at 4-3) X greater than or equal to 0.4. This signal will be high whenever the X-axis is more than four-tenths of an inch away from its final position. The output of 411 states that the third digit of X is equal to zero. This is gated with other signals to generate the signals X equals zero (at 4-9), $0 < X < 0.01$ (at 4-8), and $0.01 \leq X < 0.2$ (at 4-6). The gate arrangement near the bottom of FIG. 3 states that $X_4$ and $X_3$ are both equal to zero. The inverters of 414 and 415, and 418 and 419 are put in for "race" purposes. It was found that there was a decoding spike generated at the zero output if we didn't delay the signal coming through and we were getting false zero indications without the inverters, so they actually provide no other purpose except for delaying the signal.

The one-shot 453-458 shown at the lower part of FIG. 4 is the in-position one-shot. Whenever both axes come into the zero position, the one-shot produces a pulse. This output is shown at the output of 457 and 458. Both phases of this are used elsewhere in the circuitry.

Figure 5:
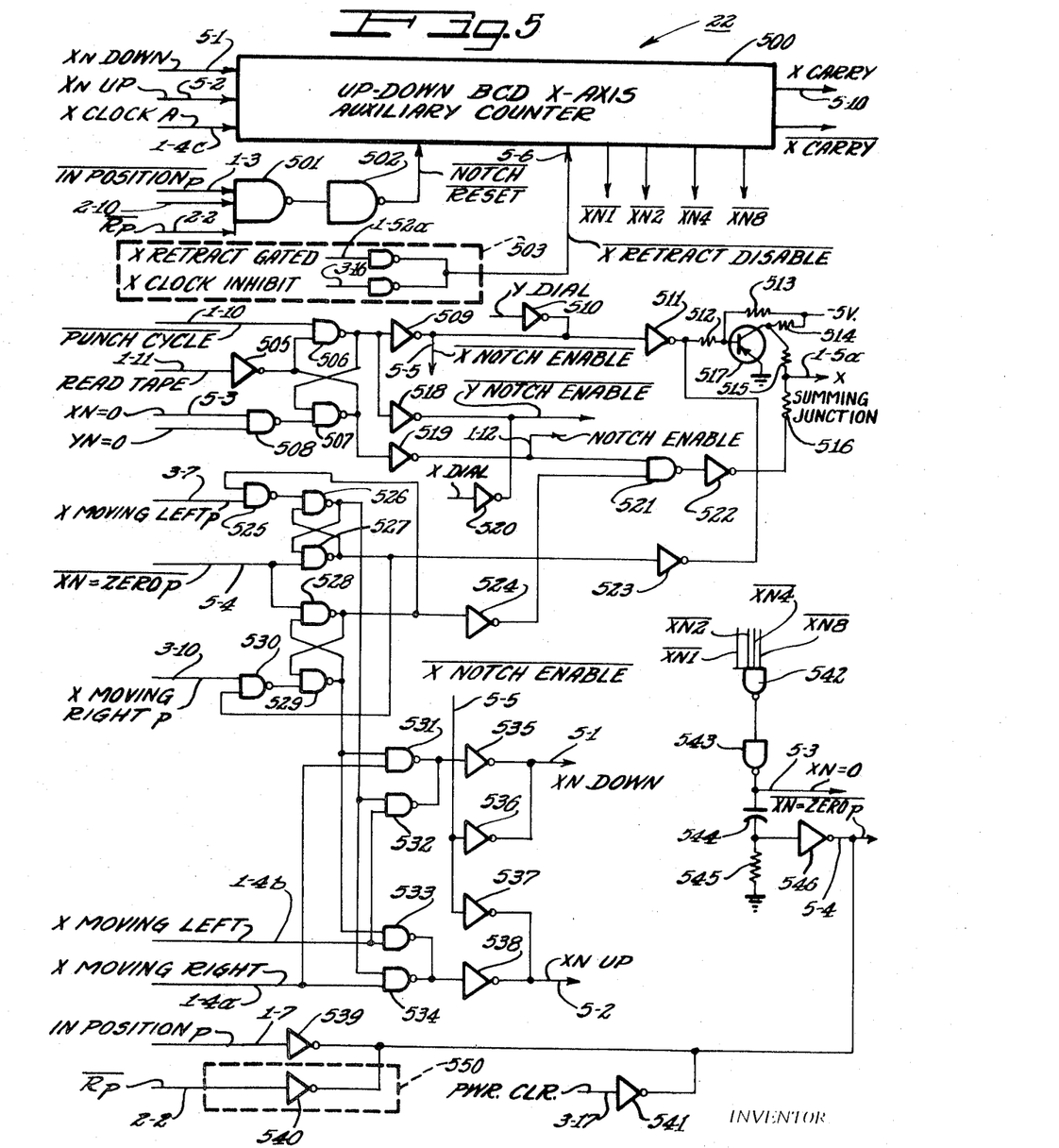
FIG. 5 is a logical diagram showing a preferred "notch" or auxiliary counter circuit for the system of FIG. 1.

Auxiliary Counting Circuit of FIG. 5

Component 22 contains the X and Y auxiliary counting or "notch" circuitry. The word notch may be taken to suggest the holding of the axes at a desired position once the axes have come into position and during punching and reading a block of tape; specifically the X- and Y-axes are held in position by means of a closed servo loop during the punching and tape reading operations. Only the X notch circuitry is shown in FIG. 5 as it and the Y notch circuitry are both the same.

The X-axis auxiliary up-down counter 500 may be similar to the input decade of counters 18 in structure and operation. Counter 500 is controlled by zero crossing networks comprised in the X-axis of elements 525-530 and 542-546. The inputs to the counter 500 are identical to the inputs to the main counters such that only when up or down signals are received (at lines 5-1 or 5-2) and the axis is not in retract (as signaled by the circuitry within dash rectangle 503) can this stage count. An X notch enable signal is generated by elements 505-509. Basically, this circuit works as follows: 506 and 507 form a flip-flop, the output of 506 is set high whenever the system is in a punch cycle or reading tape. It will not go low again until the system has finished punching, finished reading tape and both the X and Y auxiliary or notch counters have zeroed themselves out meaning that the system is back in its original end position again and execution of a new command can be started. This was found necessary in order to keep the machine from accumulating error, that is if the load ever shifted by one-thousandth inch during punching, an error would show up on the next move; therefore, the auxiliary or notch counter has to move the load back into position and then it is allowed to move under control of the main counters after that. The notch enable signal at 1-12 is the signal that allows the main counters 18 to control the axis motion. When the notch enable signal is zero, the main counter is enabled. When the notch enable signal is high, the notch counters such as 500 have control of the X-axis motion. The output of the zero crossing circuitry 525-530 is decoded in an identical manner to the zero crossing circuitry of FIG. 3 and in addition is used to supply a signal (via line 1-5a) to the summing junction of an operational amplifier of component 21. The input at 5-6 to counter 500 is a signal called X retract disable. This signal is controlled by the X retract gated signal from circuitry 21 (FIG. 6) and the X clock inhibit signal from the counter control of FIG. 3. These two signals are inverted and "collector ored" at region 503 to produce an X retract disable. Basically, what this does is disables the notch counter 500 from the time the system goes into retract until it comes out and the first marker pulse occurs (at 1–1c, FIG. 3). At the upper left in FIG. 5 are two gates, 501 and 502. These generate a reset signal to the stages of counter 500 whenever an in position signal appears at 1–3 or a power clear at 2–10. Also a line $\overline{R_P}$ is connected at 2–2 at the input to 501. The $\overline{R_P}$ signal is generated upon reaching the retract position and serves to reset the notch counter 500 also. At the bottom of FIG. 5, 539–541 are "collector ored" with 546. These set the outputs of 527 and 528 high in response to an in-position or a power clear or an X notch equal to zero. This signal has also been "ored" with the $\overline{R_P}$ signal at region 550 so that when the retract pulse is generated (see the lower part of FIG. 6), the crossover network will be set in the Zero state.

Figure 6:
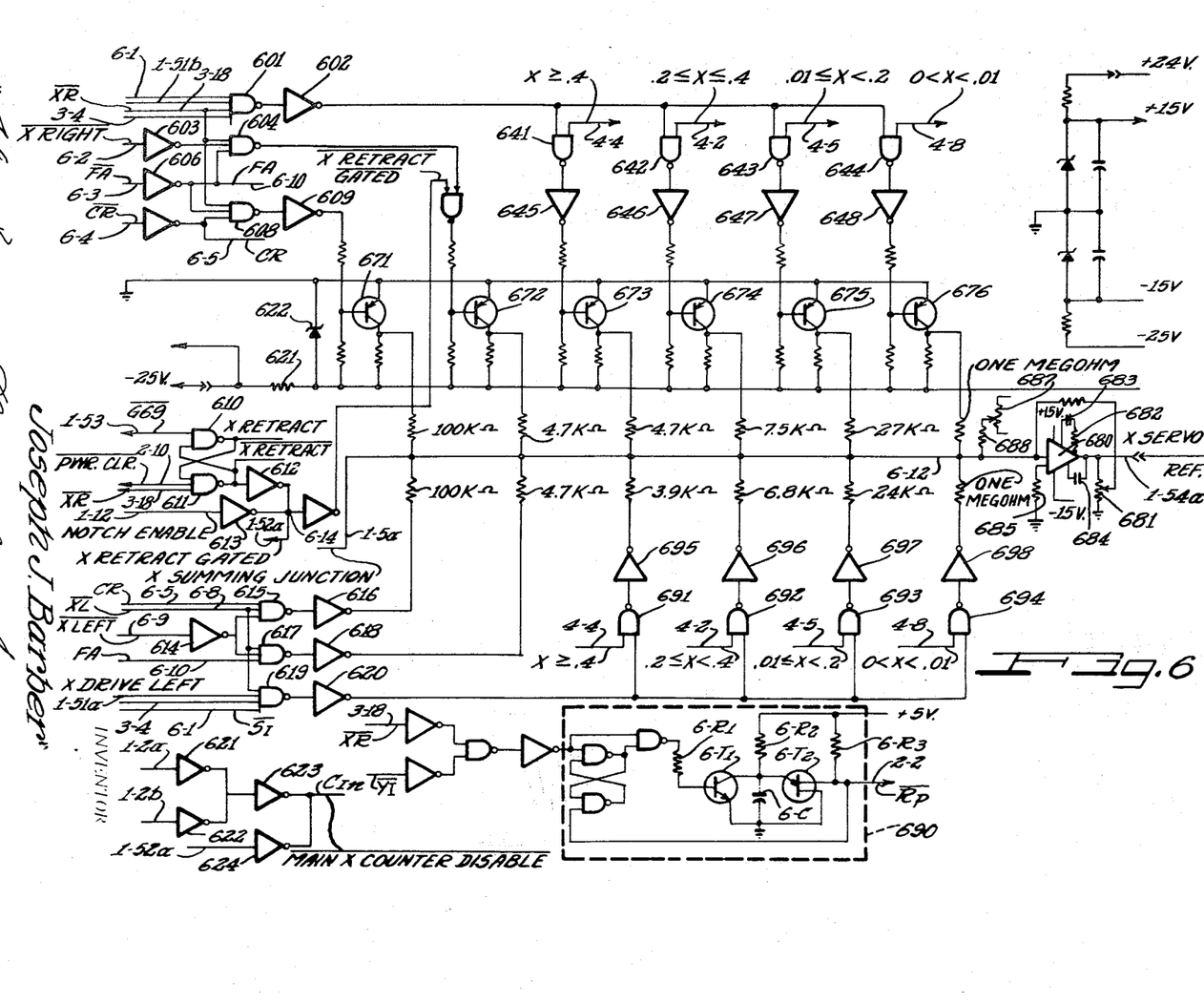
FIG. 6 illustrates a preferred digital to analog converter circuit for the system of FIG. 1.

Digital to Analog Converter Circuit of FIG. 6

The digital to analog converters of component 21, FIG. 1, for the X- and Y-axes are identical so only the X-axis converter is shown in FIG. 6. Element 680 in the middle extreme right of FIG. 6 is a Motorola MC1709P integrated circuit operational amplifier. It receives its supply voltages which are plus and minus 15 volts from the simple power supply shown at the upper right hand corner of FIG. 6. The 0 – 10,000 ohm potentiometer 681 shown going from the output of the amplifier 680 to ground is a gain adjustment which controls the amount of feedback that is fed back around the operational amplifier. The 1,500 ohm resistor 682 and the 2,000 picofarad (2000 micromicrofarad) capacitor 683 are used for frequency compensation as is the 68 picofarad capacitor 684. The 1,200 ohm resistor 685 is simply a balancing resistor going into the noninverting input of the amplifier. The inverting input is at conductor 6–12. This is the summing junction of the amplifier. Its output appears at conductor 1–54a and is a signal called the X servo reference which is actually the input to the X servo amplifier (not shown) of component 11, FIG. 1. The 0.1 megohm potentiometer 687 and the 470,000 ohm resistor 688 are used for zero balancing purposes to set the output of the amplifier 680 to zero when the input is zero. The one-shot 690 at the bottom middle of FIG. 6 is the one-shot that generates the $\overline{R_P}$ pulse. The $\overline{XR}$ signal comes from the XR limit switch, FIG. 3, and the $\overline{YI}$ signal comes from a similar (Y-axis in) limit switch (not shown), which is closed when the Y-axis reaches its retracted position.

Starting at the lower left hand section of the digital analog converter, elements 614–620 are controlled by an $\overline{XL}$ signal which is a signal coming from the X left limit switch —it will be a zero when you hit the X left limit. This signal going to zero will force the outputs of 615, 617, and 619 all high thus forcing the outputs of their respective inverters low. This will disable all lines from driving the axis. The $\overline{X\text{ left}}$ signal going into 614 comes from the X left pushbutton on the control panel. This goes to a zero whenever the button is depressed meaning that you want the X-axis to move left in a manual (or jog) mode. The output of this inverter 614 goes through 615 or 617 depending on whether you're in the fast or creep modes, that is $\overline{CR}$ or $\overline{FA}$. They will provide an input to the operational amplifier 680. The output of an inverter such as 616 consists merely of an NPN-transistor (not shown) with its emitter tied to ground and its collector pulled up to 5 volts through a 2,000 ohm resistor. Thus whenever the system is not in an X limit and is in the creep mode and the X left pushbutton is depressed, the output of 616 will tend to go high. In other words, the transistor will be cutoff. This will allow current to flow from the 5 volt supply through its 2,000 ohm resistor into the 100,000 ohm (100 KΩ) resistor that goes to the summing junction 6–12 of the operational amplifier. This allows a certain amount of current to flow into the amplifier and produces an output voltage at 1–54a of the amplifier which is used as a reference to the servoamplifier. The transistors 671–676 seen in the middle of FIG. 6 with the emitters tied to ground are all PNP-transistors type 2N5138. They are used simply to provide a minus input to the amplifier 680 such that the system can run in the opposite or right-hand direction. Thus when we want to go fast left, 618 works the same way 616 did. When in automatic, 619 and 620 come into play. If we get a servo inhibit, we'll have a zero at input 6–1 of 619. That's the $\overline{SI}$ signal. This will go to zero whenever you get a servo inhibit from the machine tool and inhibit your drives from running. Your retract disable at 3–4 is a signal generated to prevent a reference being applied to the servoamplifier 680 other than the retract reference (from 612) when the machine is retracting.

The retract disable signal at 3–4 is generated in FIG. 3 at the bottom left-hand corner of the sheet. This occurs as soon as you read a G69 from tape via line 1–53 and stays there until the retract pulse $R_P$ (see FIG. 6 at the bottom) is generated when both axes reach retract. The output of 620 then will be high whenever we want to drive left in the automatic or manual dial input modes. The four different slowdown points come in on elements 691–694. These will cause outputs to appear from one of 695–698 depending on which position the axis is in at any given time; thus when it is greater that 0.4 of an inch away from its target position, an output will appear at 695. This will pump current into the summing junction 6–12 of the amplifier and give maximum reference to cause the servos to make their motors drive at maximum speed which is 250 inches per minute. As soon as your reach 0.4 of an inch, the output of 695 will disappear, an output will appear from 696. This will be an intermediate speed which will last until the axis reaches 0.2 of an inch of the destination or end point at which time that reference will go away and an output will appear at 697. This will cause a smaller reference to appear at the input to the servoamplifier until the axis is 0.01 of an inch away from the end position at which time that reference will disappear and an output will appear from 698. This will cause a very small reference to be applied to the servoamplifier causing the motor to move at a very slow speed when it is in this range to bring it into position. The elements 641–648 on the upper half of FIG. 6 work the same way.

You will notice that all the circuitry looks similar, the only difference being that the outputs are converted to minus voltage levels by the 2N5138 transistors 673–676 before they are applied to the operational amplifier. The purpose of this is to make the motor turn in the opposite direction when you want to drive right. The 1N5231 zener diode goes to minus 25 volts through a 330 ohm 2 watt resistor 621. This causes the anode of 622 to be at minus 5 volts. (It's a 5.1 zener diode.) Thus when the output of 609 is at zero, the 2N5138 transistor 671 will be saturated by current flowing out of its emitter into its base down through the 33 kilohm resistor 624 to minus 5 volts; thus the collector of transistor 671 will be at ground. When the output of 609 goes high, the 2N5138 transistor 671 will be cut off since its base will be pulled at a voltage more positive than its emitter. Thus the collector will tend to go toward minus 5 volts. Whether or not it actually gets to 5 volts depends on what load resistor is on it. In the case of very large resistances like 20,000 ohms (20 KΩ) and up, it will; at lower resistances it will tend to be somewhat less than minus 5 volts. This is immaterial since all that is required is the proper current input to the operational amplifier 680. The Y-axis D to A converter, of component 21, FIG. 1, is exactly the same manner as the X-axis converter shown in FIG. 6.

When we read a G69 in off of tape, the flip-flop formed by 610 and 611 will have a high appear at the output of 610. This will cause the output of 612 to go high. The high signal at 6–14 is supplied to transistor 672 to convert it to a minus voltage. (The axis must run right when it retracts.) The flip-flop formed by 610 and 611 will be reset as soon as the X-axis hits the right limit switch. At the time where $\overline{XR}$ goes low, it will cause the flip-flop to change state and remove the retract reference from the operational amplifier. Power clear (at 2–10) also does this so that the system won't go into retract when the power is turned on. The gate 613 receives the notch enable signal which will be high whenever the machine is punching or reading tape. This holds the potential at 6–14 low until the machine is done punching and reading tape. The reason for this is that during punching, the block with a G69 code is read, and the system should not go into retract while punching. As soon as the punch is finished, the notch enable at 1-12 will go low, the retract gated signal at 1-52a will go high and enable the machine to retract. The Y retract operation is similar. It too takes a minus input to the operational amplifier.

Servoamplifiers of Component 11

The servoamplifier for both the X- and Y-axes operate almost identically to the servo drives in the Houdaille Electronics Division computer supervised numerical control. The servo reference input comes from the output of the operational amplifiers via line 1-54, FIG. 1, and 1-54a, FIG. 6. The feedback input comes from a tachometer connected to the shaft of the motor in the machine tool. The SCR's used are 2N686's made by Motorola. These are fired by the servoamplifiers at various firing angles depending on the size of the input reference and cause the motor to run at the speed called for. A dynamic braking relay (not shown) is used such that when an all stop is pulled, it disconnects the armature from the armature supply and shorts it out causing it to stop in minimum of time. The synch inputs on the servoamplifiers are grounded under the control of further relays which are energized to disable the servos.

Punch Control 23

A one-shot (not shown) produces a pulse when the punch pushbutton on the control panel 10 is depressed. This is used in the punch circuitry which includes a flip-flop (not shown) used to turn the punch on. When power is first applied to the control, the power clear comes through to force the output of the flip-flop to ground potential thus assuring start up with a punch off condition. Whenever a G68 is read off tape and appears via 1-6, the output of the flip-flop goes high and enables punching to occur automatically. Whenever a G67, an M06 or an M75 is read off tape, the output of the flip-flop goes low and disables the machine from punching automatically. With the output of the flip-flop high, automatic punching can occur provided a punch inhibit signal is not received from the machine tool. This comes from a switch filter at control panel 10.

If all desired conditions are met and we have a cycle start and are in the automatic mode, the signal punch cycle can go high and the signal punch cycle will go low when the axes come into position. This causes the out-put at 1-8, FIG. 1, to go high and stay high until it is reset by the up limit switch. The up limit switch, this is signal UL going to the punch control via line 1-9, comes from a switch on the machine tool which closes when the punch has completed its cycle.

On the turret press which is represented at 11, FIG. 1, the solenoids in the machine tool are not driven by relays as they are in other machines but are driven by triac assemblies (not shown). A triac is a device which will pass AC current with it is actuated. There is a small reed relay in the assembly which the relay drivers (not shown) pull in to cause the triac to switch the solenoid on. The signal Punch Cycle at line 1-8 causes the 2N5135 transistor of the relay drivers to saturate, to turn on the punch light on the control panel 10 and energize the reed relay in the triac assembly in the machine tool which engages the punch solenoid. This is disengaged when the punch cycle signal changes state due to the up limit switch being actuated.

The dynamic brake relay is deenergized whenever the machine is in all stop. This, as described earlier, disconnects the motor armatures from their respective supplies and shorts out their armatures to stop them in the shortest possible time. The cycle start indicator light is turned on whenever the cycle start pushbutton has been pushed (producing signal Start which in turn produces the signal tape start at 1-21e provided X =Y =0 at line 4-12 of FIG. 4) and a cycle stop has not been seen; thus it is turned on whenever the cycle start flip-flop 209, 210, at the upper left of FIG. 2 is in the logical one representing state.

The advantages of this numerical control over one presently available numerical control are as follows: it will position approximately 10 percent faster than the prior control will; the prior control is limited by a 0.003" overshoot, and this restriction does not occur in the present system which can overshoot by any amount and still position. The switch filter 350, FIG. 3 used in this control is similar to a prior art switch filter which was used in a discrete logic line. The one-shot described earlier in reference to FIG. 2A is in so far as is known unique. It was developed specifically for purposes of eliminating noise problems with one-shots. The parity check circuit of component 12 is similar to a prior art design. The zero crossing network shown in FIGS. 3 and 5 is an extremely useful network. It allows the system to keep track of which side of zero the axes are on or whether the axes are at zero at all during positioning. The auxiliary or notch circuitry of FIG. 5 was found to be quite necessary to hold the lead screws in position during punching or reading tape. The digital to analog converters of FIG. 6 use the logic to drive the converters directly.

Summary of Operation

The general operation of the illustrated embodiment has been described in connection with the discussion of the block diagram of FIG. 1. In automatic operation, a Tape Start signal is supplied from the control panel circuits 10 via a conductor 1-21e, FIG. 2 of line 1-21, FIG. 1, to the tape reader control 14 which is shown in detail in FIG. 2. The tape reader 12 then reads a block of tape, transferring successive digits of the X and Y displacement commands from the tape via conductors 1-31 to 1-34 and line 1-38 to the X- and Y-axis main counters 18.

The digital displacement commands in the counters 18 are interpreted by the circuitry 21 so as to provide an analog error signal via line 1-54 to the machine tool 11. The details of the circuitry 21 for generating the analog error signal (at 1-54a in FIG. 6) is shown in FIGS. 4 and 6. Various slow down points are determined by the position decoder logic of FIG. 4 and corresponding analog signals of proper polarity are produced by the converter network of FIG. 6.

As the machine axes move toward the commanded end position, the main counters 18 are caused to count down by means of the feedback path through line 1-1, counter control 20 and line 1-2, so that the main counters register zero count when the axes arrive at the end position.

The arrival of the X- and Y-axes at the commanded end position is sensed by the one-shot 451-458 at the bottom of FIG. 4. The in position pulse signal at output line 1-3 in FIG. 4 serves to reset the auxiliary counter 500, FIG. 5. The pulse signal at 2-6 at the bottom of FIG. 4 is supplied to the tape reader control of FIG. 2 to restart the tape reader, and the pulse signal at conductor 1-7 at the bottom of FIG. 4 is transmitted to the punch control 23, FIG. 1, to initiate a punch cycle, providing the punch code is supplied via conductor 1-6 from the tape decoder 15.

With respect to the in position circuit at the bottom of FIG. 4, the timing of the pulse circuit 456 may be such that the common null signal X =Y =0 condition at control input 4-12 must be true for approximately 30 milliseconds, in order to obtain an output pulse. In other words, if the X-axis main counter shifts out of a zero count condition within the 30 millisecond timing interval, the control input 4-12 will return to a low condition, causing the output of 453 to go high, and rendering the T1 transistor (see FIG. 2A) of pulse circuit 456 prematurely conductive, thereby preventing the firing of the T2 unijunction transistor of the pulse circuit. Thus the one-shot circuit 451-458 insures that the in position pulses will only occur if the X and Y main counters both remain at the zero count condition simultaneously for the timing interval of the pulse circuit 456 (for example 30 milliseconds).

As soon as a tape reading or punch operation is initiated, the signal at line 1–12 at the middle of FIG. 5, Notch Enable, is true, disabling the main counters 18 by means of inverter 613, FIG. 6, supplying the X retract gated signal via conductor 1–52a, FIG. 6, to inverter 624 at the lower left in FIG. 6. (A low at $C_{in}$ disables the main counter to which it is connected.) At the same time, the X Notch Enable line 5–5 at the center of FIG. 5 goes low as to enable the auxiliary counter circuits including logic elements 531–538 at the lower part of FIG. 5. With the auxiliary counters 22 enabled, any slight shifting of the machine table is sensed via the feedback path along line 1–4, FIG. 1, so as to maintain closed loop control of the machines axes during tape reading and punching operations.

When the end of block signal at TR8 (conductor 2–5, FIG. 2) occurs the Read Tape signal at 1–11 goes low; similarly when the punch operation is complete, the Punch Cycle signal at 1–10 goes high, allowing control to pass to the main counters as soon as the notch counters of component 22 register zero error. (See components 505–508, FIG. 5).

As will be understood by those skilled in the art, the term "axis" is used herein in some instances in an ordinary sense as referring to a direction along which the machine tool table may be moved, while at other times the term "axis" is used as referring to the portion of the machine tool which is driven in a given direction (such as right or left, or in or out). The sense in which the term "axis" is used will be apparent from the context.

The term "line" is used herein to comprehend both a single conductor or a plural conductor electrical connection.

The small letter "p" following certain of the signal designations on the drawings is for the purpose of indicating signals having a pulse waveform exhibiting only a momentary transition to a given logic level.

The switch filters such as indicated at 350 in FIG. 3 may be similar to a known circuit with logic levels of zero and −3 volts except that with the input to the switch filter open or floating, current will flow from the 24 volt supply through a 1,500 ohm resistor 251 to provide an output logic level of approximately 4.7 volts, and with the input to the switch grounded, current will flow through a 4,700 ohm resistor 352 to the minus 25 volt supply to cause the output at 3–18 to be at 0 volts. A 10 microfarad capacitor is provided for filtering purposes. All of the switch filters have this construction in order to eliminate switch contact bounce and noise on the ground when the switches are closed either in the machine tool or on the control panel.

Certain parts of the illustrated system have been indicated only diagrammatically since these parts may be conventional and per se form no part of the present invention. It is considered that a detailed showing or description of such details would tend to obscure rather than clarify the disclosure of the preferred embodiment of the invention.

I claim as my invention:

1. A control system comprising
a first closed loop control circuit for receiving successive displacement commands during successive input cycles, and for positioning a load in accordance therewith during successive positioning cycles,
a second closed loop control circuit capable of controlling the position of the load, and
means for disabling the first control circuit after each successive positioning cycle to enable the supply of a succeeding displacement command thereto, and for enabling the second control circuit during the successive input cycles to maintain positioning control of said load.

2. A control system according to claim 1 with
an operational amplifier having a summing input and having an output for controlling movement of said load,
said first control circuit comprising main analog error means for controlling energization of the summing input during a positioning cycle, and
said second control circuit comprising auxiliary analog error means for controlling energization of said summing input during said successive input cycles.

3. A control system comprising
main counter means for registering successive displacement commands calling for displacement of a load along a given axis, and for responding to motion pulses in accordance with the movement of the load so as to control movement of the load to each successive commanded end position,
counter control means controlling the counting of said motion pulses by said main counter means and operative when the load reaches a commanded end position to disable counting of said motion pulses by said main counter means during registering of a new displacement command therein,
auxiliary counting means operative to respond to motion pulses while the main counter means is disabled so as to maintain an error count having a magnitude and polarity in accordance with any shifting of the load, and
means responsive to any error count in said auxiliary counting means for driving the load to a position corresponding to a zero error condition of auxiliary counting means.

4. A control system according to claim 3 with said counter control means being connected with said auxiliary counting means for preventing a reenabling of said main counter means unless said auxiliary counting means is in its zero error condition.

5. A control system according to claim 3 with the main counter means counting down to zero during execution of each successive displacement command, and means for resetting said auxiliary counting means to a zero count each time the load is positioned at a commanded end position to place said auxiliary counting means in said zero condition prior to disabling of said main counter means.

6. A control system according to claim 3 with
an operational amplifier having a summing input and having an output for controlling driving of the load,
main analog error means responsive to the count in said main counter means for controlling energization of said summing input during movement of the load to a commanded end position, and
auxiliary analog error means connected with said summing input and responsive to any error count in said auxiliary counter means for controlling energization of said summing input during the time when said main counter means is disabled.

7. The method of controlling positioning of a load at successive commanded end positions which comprises
registering successive displacement commands in a counter which receives motion pulses in response to movement of the load so as to control movement of the load to each successive commanded end position
disabling counting of the motion pulses by the counter when the load reaches a commanded end position and a new displacement command is being registered therein, and
activating an auxiliary closed control loop to maintain the position of the load during the interval when the counter is receiving a new displacement command.

8. A method according to claim 7 with the second closed control loop having an auxiliary counter which is activated to count the motion pulses while the new displacement command is being registered, to develop an error count in accordance with any shifting of the load, and controlling the position of the load in response to any error count in the auxiliary counter until the new displacement command has been registered.

9. In a plural axis control system having means for generating axis null signals as the load reaches a commanded end position along the respective axes, and gate means for generating a common null signal during intervals when the load is at the commanded end position with respect to each of the axes simultaneously, the improvement comprising
a timing circuit for executing a timing cycle and having a control input for controlling the continuation of said timing cycle, said control input being responsive to a timing interrupt signal to interrupt the timing cycle, and timing circuit control means connected with the control input of said timing circuit and controlled by said common null signal to initiate a timing cycle in response to the occurrence of said common null signal and responsive to the termination of said null signal during a timing cycle to transmit said timing interrupt signal to said control input of said timing circuit and thereby prevent said timing circuit from emitting an output signal.

* * * * *